(12) United States Patent
Sebire et al.

(10) Patent No.: US 9,301,215 B2
(45) Date of Patent: Mar. 29, 2016

(54) APPARATUS, METHOD AND COMPUTER PROGRAM PRODUCT PROVIDING SYNCHRONIZED HANDOVER

(75) Inventors: Benoist Sebire, Tokyo (JP); Lars Dalsgaard, Oulu (FI); Jarkko T. Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 309 days.

(21) Appl. No.: 12/522,945

(22) PCT Filed: Jan. 11, 2008

(86) PCT No.: PCT/IB2008/000068
§ 371 (c)(1),
(2), (4) Date: May 4, 2010

(87) PCT Pub. No.: WO2008/084395
PCT Pub. Date: Jul. 17, 2008

(65) Prior Publication Data
US 2010/0290427 A1      Nov. 18, 2010

Related U.S. Application Data

(60) Provisional application No. 60/880,286, filed on Jan. 12, 2007.

(51) Int. Cl.
*H04W 36/00*      (2009.01)
*H04W 40/36*      (2009.01)
*H04W 74/08*      (2009.01)

(52) U.S. Cl.
CPC .......... *H04W 36/0055* (2013.01); *H04W 40/36* (2013.01); *H04W 74/08* (2013.01)

(58) Field of Classification Search
CPC ............ H04W 36/0055; H04W 48/16; H04W 36/0072; H04W 74/0833; H04W 74/08; H04W 74/006; H04L 1/0026
See application file for complete search history.

(56) References Cited

U.S. PATENT DOCUMENTS 5,711,003 A * 1/1998 Dupuy ......................... 455/436
5,991,620 A * 11/1999 Kingdon et al. ........... 455/432.3
(Continued)

FOREIGN PATENT DOCUMENTS

CN         1889785 A         1/2007
WO     2008041115 A1        4/2008

OTHER PUBLICATIONS

3GPP TR 25.913, Requirements for Evolved UTRA (E-UTRA) and Evolved UTRAN3rd Generation Partnership Project; Technical Specification Group Radio Access Network; Requirements for Evolved UTRA (E-UTRA) and Evolved UTRAN (E-UTRAN) (Release 8) Dec. 2008.
(Continued)

*Primary Examiner* — Yee Lam
(74) *Attorney, Agent, or Firm* — Harrington & Smith

(57) ABSTRACT

A method is described which provides a synchronized HO of a mobile device. The method includes receiving a HO command. A determination is made of whether the HO command includes an indication of UL resource allocations. A C-RNTI is waited for in DL signaling if the HO command does not include the indication of UL resource allocations. If the HO command includes the indication of UL resource allocations, transmitting occurs based on the UL resource allocations. The method may be performed as a result of execution of computer program instructions stored in a computer readable memory medium. An apparatus is also described.

18 Claims, 6 Drawing Sheets

(56) References Cited

U.S. PATENT DOCUMENTS

| | | | | |
|---|---|---|---|---|
| 6,078,813 | A * | 6/2000 | Ljung | 455/436 |
| 6,366,781 | B1 * | 4/2002 | Hussain et al. | 455/456.5 |
| 7,809,373 | B2 * | 10/2010 | Park et al. | 455/436 |
| 2002/0009070 | A1 * | 1/2002 | Lindsay et al. | 370/347 |
| 2003/0223452 | A1 * | 12/2003 | Toskala et al. | 370/442 |
| 2006/0291416 | A1 * | 12/2006 | Rexhepi et al. | 370/331 |
| 2007/0015511 | A1 * | 1/2007 | Kwun et al. | 455/436 |
| 2007/0047493 | A1 * | 3/2007 | Park et al. | 370/331 |
| 2007/0149206 | A1 * | 6/2007 | Wang et al. | 455/450 |
| 2007/0153733 | A1 * | 7/2007 | Kim et al. | 370/329 |
| 2007/0167165 | A1 * | 7/2007 | Yang et al. | 455/439 |
| 2007/0293224 | A1 * | 12/2007 | Wang et al. | 455/436 |
| 2008/0056193 | A1 * | 3/2008 | Bourlas et al. | 370/331 |
| 2008/0167089 | A1 * | 7/2008 | Suzuki et al. | 455/574 |
| 2008/0254800 | A1 * | 10/2008 | Chun et al. | 455/438 |
| 2009/0129335 | A1 * | 5/2009 | Lee et al. | 370/331 |
| 2010/0255844 | A1 * | 10/2010 | Fischer et al. | 455/436 |

OTHER PUBLICATIONS

"Non-Content Based Handover Execution" 3GPP TSG-RAN WG2 #55, R2-063082 Riga, Latvia, Nov. 2006.

3GPP TS 44.018, Radio Resource Control, 3rd Generation Partnership Project;Technical Specification Group GSM EDGE Radio Access Network; Mobile radio interface layer 3 specification, Radio Resource Control Protocol (Release 2000), Aug. 2000.

3rd Generation Partnership Project; Technical Specification Group Radio Access Network; Evolved Universal Terrestrial Radio Access (E-UTRA) and Evolved Universal Terrrestrial Radio Access Network (E-UTRAN); Overall description; Stage 2 (Release 8) 3GPP TS 36.300 vol. 3.1.

Office Action received in European Patent Application No. 08702231.5, dated Aug. 25, 2010, 6 pages.

Office Action received in European Patent Application No. 08702231.5, dated Mar. 28, 2011, 6 pages.

Office Action received in Korean Patent Application No. 10-2009-7016734, dated Feb. 8, 2011, 5 pages.

International Search Report and Written Opinion of the International Searching Authority for PCT Application No. PCT/IB2008/000068, dated Jun. 5, 2008, 7 pages.

Office Action received in corresponding Korean Application No. 2009-7016734, dated Aug. 29, 2011, 6 pages.

Riga, Latvia, 3GPP TSG-RAN WG2 Meeting #55, Nov. 6-10, 2006, 3 pages.

Office Action received in corresponding Canadian Application No. 2675141, 3 pages.

Office Action received in corresponding Chinese Application No. 200880005981.1, dated Aug. 18, 2011, 11 pages.

3GPP TR 25.913 V7.3.0 (Mar. 2006) 3rd Generation Partnership Project; Technical Specification Group Radio Access Network; Requirements for Evolved Utra (E-UTRA) and Evolved UTRAN (E-UTRAN) (Release 7) (18 pages).

3GPP TS 44.018 V7.7.0 (Dec. 2006) 3rd Generation Partnership Project; Technical Specification Group GSM/EDGE Radio Access Network; Mobile radio interface layer 3 specification; Radio Resource Control (RRC) protocol (Release 7) (394 pages).

* cited by examiner

APPARATUS, METHOD AND COMPUTER PROGRAM PRODUCT PROVIDING SYNCHRONIZED HANDOVER

RELATED APPLICATION

This application was originally filed as PCT Application No. PCT/IB2007/000068 filed on 11 Jan. 2008 and claims priority to US Application No. 60/880286 filed Jan. 12, 2007.

TECHNICAL FIELD

The exemplary and non-limiting embodiments of this invention relate generally to wireless communication systems, methods, devices and computer program products and, more specifically, relate to techniques for handing over a mobile device from one cell to another.

BACKGROUND

Various abbreviations that appear in the specification and/or in the drawing figures are defined as follows:
 3GPP Third Generation Partnership Project
 aGW access gateway
 C-RNTI cell radio network temporary identifier
 DL downlink (Node-B to UE)
 DRX discontinuous reception
 EDGE enhanced data rate for GSM evolution
 eNB EUTRAN Node B
 EUTRAN evolved UTRAN
 GERAN GSM/EDGE radio access network
 GSM global system for mobile communications
 HO handover
 LTE long term evolution
 MAC medium access control
 Node-B base station
 NW network
 OFDMA orthogonal frequency domain multiple access
 PHY physical (e.g., layer 1 (L1))
 RACH random access channel
 RLC radio link control
 RRC radio resource control
 SC-FDMA single carrier frequency division multiple access
 SCH shared channel
 TA timing advance
 TDM time domain multiplexing
 UE user equipment
 UL uplink (UE to Node-B)
 UTRAN Universal Terrestrial Radio Access Network A proposed communication system known as evolved UTRAN (E-UTRAN, also referred to as UTRAN-LTE or as E-UTRA) is currently under discussion within the 3 GPP. The current working assumption is that the DL access technique will be OFDMA, and the UL access technique will be SC-FDMA.

The TA is a signal derived from the time synchronization of the UL sequence and is sent by the eNB to the UE. The UE uses the TA to advance the timing of transmissions to the eNB so as to compensate for propagation delay and, thus, time align the transmissions from different UEs within the receiver window of the eNB. By avoiding the overlapping of UL transmissions, the use of the TA allows TDM in the UL. Thus, whenever the UL access scheme is TDM based, the timing advance control information needs to be signaled from the network to the UEs. This is true for both the GERAN and E-UTRAN networks.

So long as the UE does not have any TA, the UE is normally only allowed to transmit in the UL on special allocated resources designed for this purpose. The TA can be calculated by the eNB by the UE transmitting a random access "burst" is in the UL. The random access "burst" provides a sufficiently long guard period to avoid the overlapping of uplink transmissions, but can carry only a very limited payload. Random access bursts are typically used by the UE to initiate communication with the network, when the UE does not know the TA to be used in the cell. The network's response typically contains a value for the TA to be used by the UE. Once the UE knows the TA to be used for its UL, normal communication can proceed.

Even though it can be a relatively quick process to obtain the TA information from the network, there is one case where the overall performance of the system could be increased if the UE did not have to request the timing advance to be used. More specifically, overall system performance could be improved during HO, when accessing a new cell, if the UE did not need to request the TA since not having to request and wait for the TA to be provided could potentially reduce the interruption time at HO.

A pre-synchronized handover has been standardized in GSM (3 GPP TS 44.018, V7.7.0 (2006-12) 3rd Generation Partnership Project; Technical Specification Group GSM/EDGE Radio Access Network; Mobile radio interface layer 3 specification; Radio Resource Control RRC) protocol (Release 7), see generally sub-clause 3.4.4). In E-UTRAN, a pre-synchronized handover is also being proposed (see R2-063082, Non-contention based handover execution, 3GPP TSG-RAN WG2 Meeting #55, Riga, Latvia, 6-10 Nov. 2006, Nokia).

With a pre-synchronized HO the TA to be used in the target cell is provided by the HO command sent from the source cell. There exist various means that would allow the network to assess the TA to be used in the target cell. One simple technique is when the target and source cell have co-sited antennas of the same frequency, as the TA in the target cell in this case is essentially equal to the TA in the source cell.

In GERAN, when the TA is provided in the HO command, the UE may optionally send four access bursts in the UL on the dedicated resource (CS channel) it was assigned in order to inform the target cell that is has arrived. The access bursts are sent in this case, even though the TA was provided in the HO command, due to the physical properties of the GSM L1, e.g., due to diagonal interleaving, the first four uplink slots cannot be used for speech/data transmission.

SUMMARY

An exemplary embodiment of this invention is a method to provide a synchronized HO of a mobile device. The method includes receiving a HO command. A determination is made of whether the HO command includes an indication of UL resource allocations. A C-RNTI is waited for in DL signaling if the HO command does not include the indication of UL resource allocations. If the HO command includes the indication of UL resource allocations, transmitting occurs based on the UL resource allocations.

A further exemplary embodiment of this invention is a method to provide a synchronized HO of a mobile device. The method includes receiving a HO command. A determination is made of whether the HO command includes an indication of UL resource allocations. If the HO command includes the indication of UL resource allocations, a new cell is accessed (e.g., using contention-free procedure) on a reserved portion of an UL-SCH which was indicated in the HO command. A random access procedure (e.g., a contention-based procedure) is accessed in a RACH if the HO command does not include the indication of UL resource allocations.

Another exemplary embodiment of this invention is an apparatus to perform a synchronized HO. The apparatus includes a receiver configured to receive a HO command, a processing unit, and a transmitter. The processing unit determines whether the HO command includes an indication of UL resource allocations, and waits for a C-RNTI in a DL signaling if the HO command does not include the indication of UL resource allocations. The transmitter transmits based on the UL resource allocations, if the HO command includes the indication of UL resource allocations.

A further exemplary embodiment of this invention is apparatus to perform a synchronized HO. The apparatus includes a receiver configured to receive a HO command, a processing unit, and a transmitter. The processing unit determines whether the HO command includes an indication of UL resource allocations. The transmitter transmits accesses a new cell on a reserved portion of an UL-SCH which was indicated in the HO command, if the HO command includes the indication of UL resource allocations. If the HO command does not include the indication of UL resource allocations, the transmitter transmits accesses a random access procedure in a RACH.

Another exemplary embodiment of this invention is an apparatus to perform a synchronized HO. The apparatus includes a means for receiving a HO command. A determining means determines whether the HO command includes an indication of UL resource allocations. The apparatus includes a means for waiting for a C-RNTI in a DL signaling if the HO command does not include the indication of UL resource allocations. A means for transmitting based on the UL resource allocations if the HO command includes the indication of UL resource allocations is also included.

A further exemplary embodiment of this invention is apparatus to perform a synchronized HO. The apparatus includes a means for receiving a HO command. A means for determining whether the HO command includes an indication of UL resource allocations is also included. A reserved channel access means accesses a new cell on a reserved portion of an UL-SCH which was indicated in the HO command if the HO command includes the indication of UL resource allocations. The apparatus also includes a random channel access means for accessing a random access procedure in a RACH in response to a determination that the HO command does not include the indication of UL resource allocations.

DETAILED DESCRIPTION

The exemplary embodiments of this invention are described generally in the context of ongoing LTE efforts (see, for example, 3GPP TR 25.913, V7.3.0 (2006-03), Requirements for Evolved UTRA (E-UTRA) and Evolved UTRAN (Release 7).

An as yet unresolved issue for E-UTRAN is how to access the new cell when the TA to be used in the target cell at HO is provided. When there is no timing advance provided, it has been proposed that the UE will use the UL resources of the target cell to send an access burst to allow the NW to assess the timing advance to be used by the UE (in a similar manner as in GERAN). Note that in HO commands, the identification of the UE in the new (target) cell is also provided: e.g., the C-RNTI of the UE in the target cell is given in the HO command.

Figure 1:
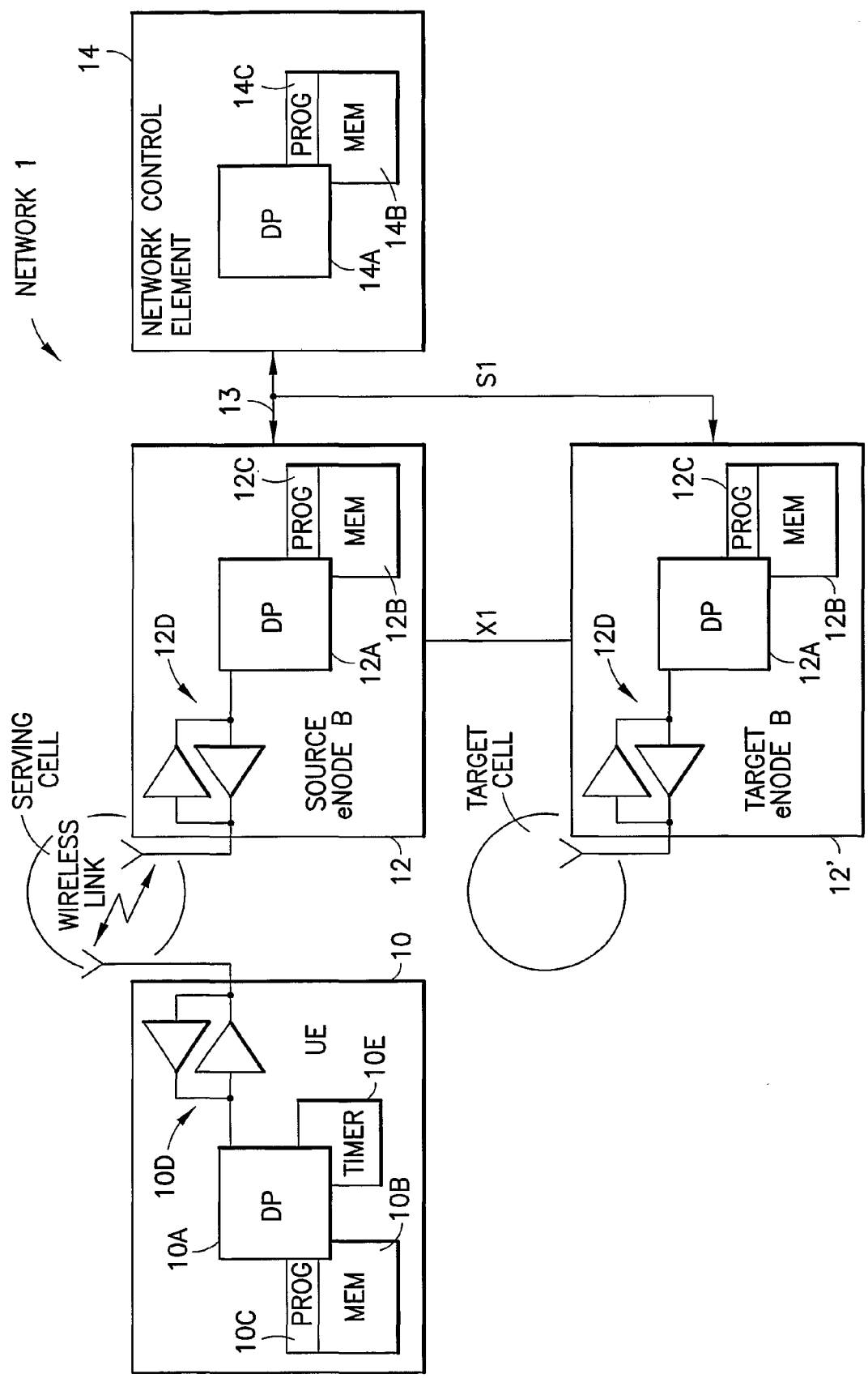
FIG. 1 shows a simplified block diagram of various electronic devices that are suitable for use in practicing the exemplary embodiments of this invention.

Reference is made first to FIG. 1 for illustrating a simplified block diagram of various electronic devices that are suitable for use in practicing the exemplary embodiments of this invention. In FIG. 1 a wireless network 1 is adapted for communication with a UE 10 via a Node B (base station) 12, also referred to herein as an eNB 12. The network 1 may include a network control element (NCE) 14, such as an access gateway (aGW). The UE 10 includes a data processor (DP) 10A, a memory (MEM) 10B that stores a program (PROG) 10C, and a suitable radio frequency (RF) transceiver 10D for bidirectional wireless communications with the Node B 12, which also includes a DP 12A, a MEM 12B that stores a PROG 12C, and a suitable RF transceiver 12D. The Node B 12 is coupled via a data path 13 to the NCE 14 that also includes a DP 14A and a MEM 14B storing an associated PROG 14C. The UE 10 can include at least one hardware and/or software timer 10E, the use of which is described below. At least the PROGs 10C and 12C are assumed to include program instructions that, when executed by the associated DP, enable the electronic device to operate in accordance with the exemplary embodiments of this invention, as will be discussed below in greater detail.

Shown for completeness in FIG. 1 is at least one second eNB, referred to as 12'. During a HO event the eNB 12 may be considered the Source eNB, i.e., the eNB to which the UE 10 is currently connected and communicating in the associated serving cell, and the eNB 12' may be considered the Target eNB, i.e., the eNB to which the UE 10 is to be connected and communicating with in the target cell after the HO procedure is completed. The serving cell and the target cell may at least partially overlap one another.

The exemplary embodiments of this invention may be implemented at least in part by computer software executable by the DP 10A of the UE 10 and by the DP 12A of the eNBs 12, 12', or by hardware, or by a combination of software and hardware.

The various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multicore processor architecture, as non-limiting examples.

In general, the E-UTRAN includes the eNBs 12, 12' that provide the E-UTRA user plane (RLC/MAC/PHY) and control plane (RRC) protocol terminations towards the UE 10. The eNBs 12 interface to the aGW 14 via an Si interface, and are inter-connected via an X2 interface.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non limiting and non-exhaustive examples.

The exemplary embodiments of this invention address and solve the problems inherent in allocating UL resources in the target cell for the UE 10 when it already has a valid TA for the target cell (e.g., by way of a HO command). The UL resources are suggested to be used by the UE 10 to send normal data (e.g., a HO CONFIRM message or normal user data). There are at least two alternatives depending on the HO command.

Figure 2A:
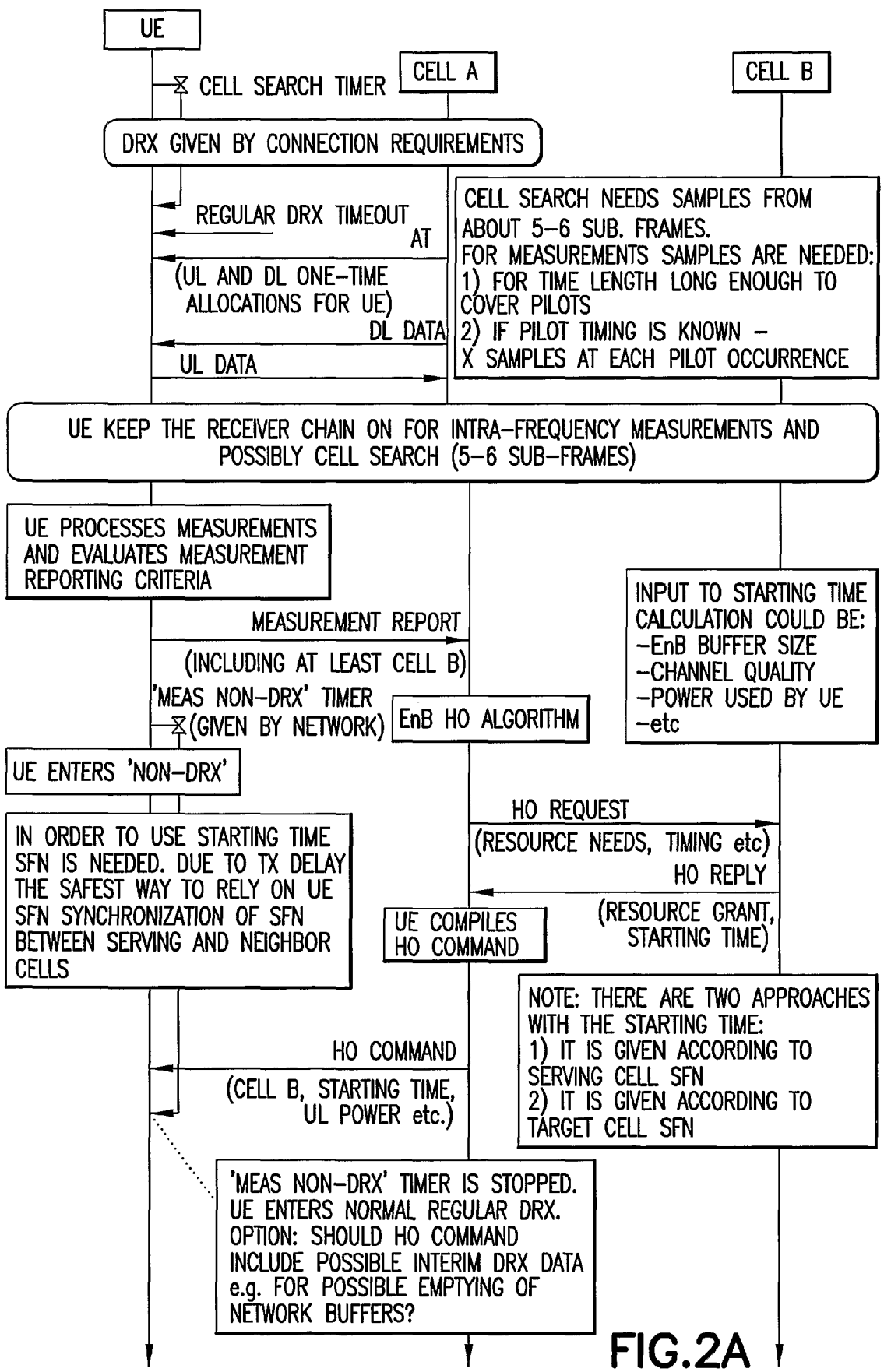
FIGS. 2A-2F, collectively referred to as FIG. 2, are message flow diagrams that depict various exemplary embodiments of this invention.
Figure 2B:
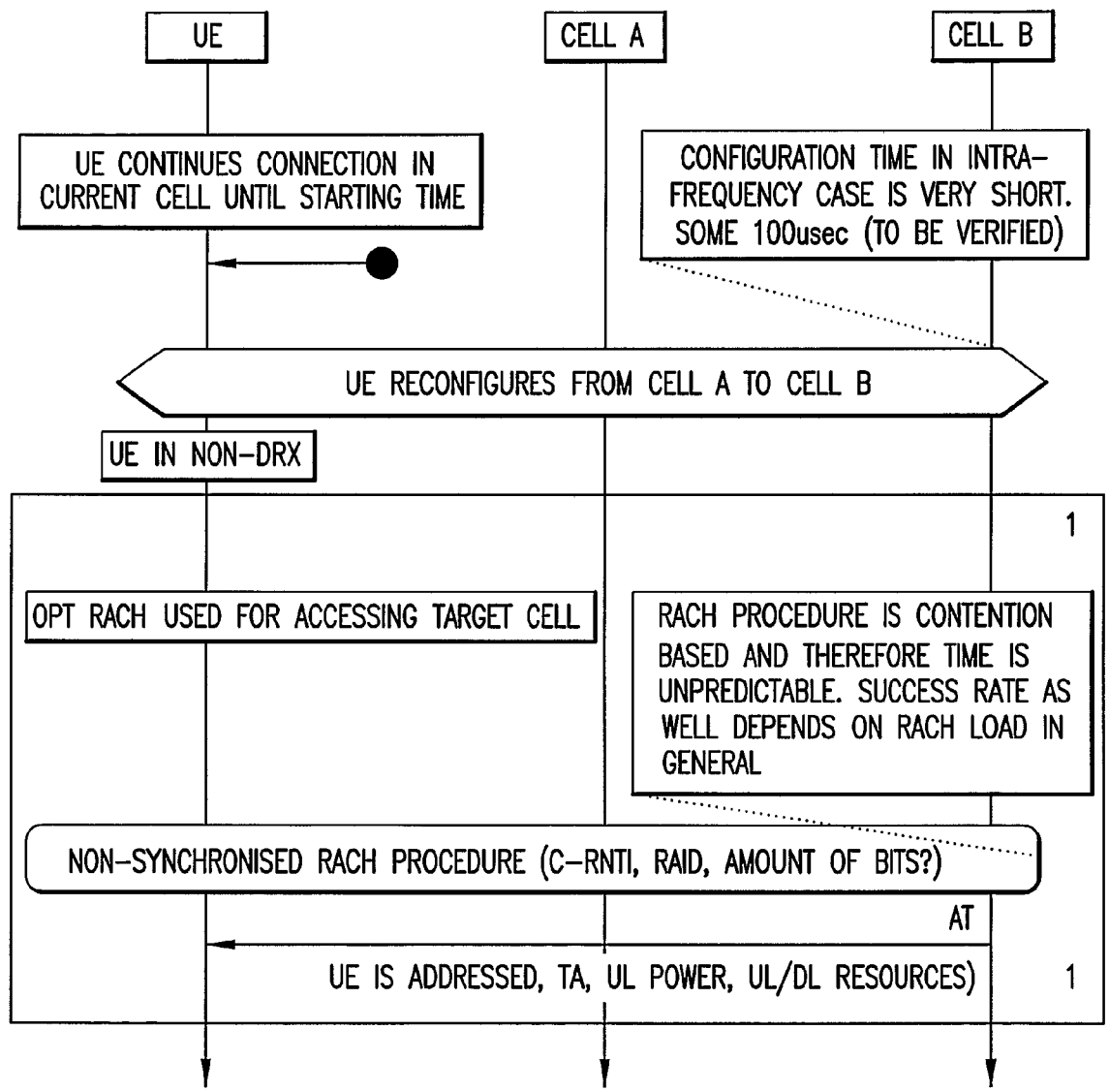
Figure 2C:
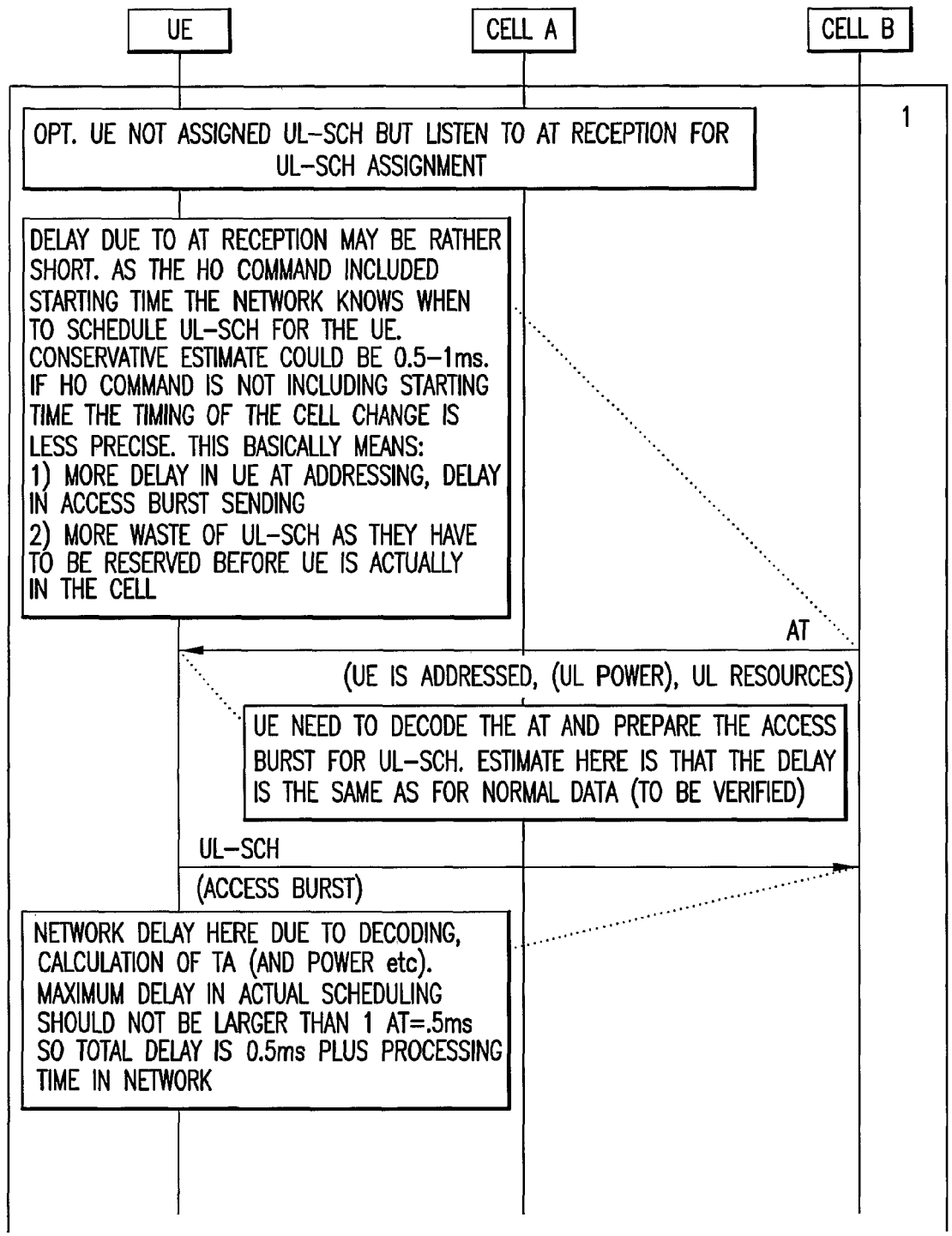
Figure 2D:
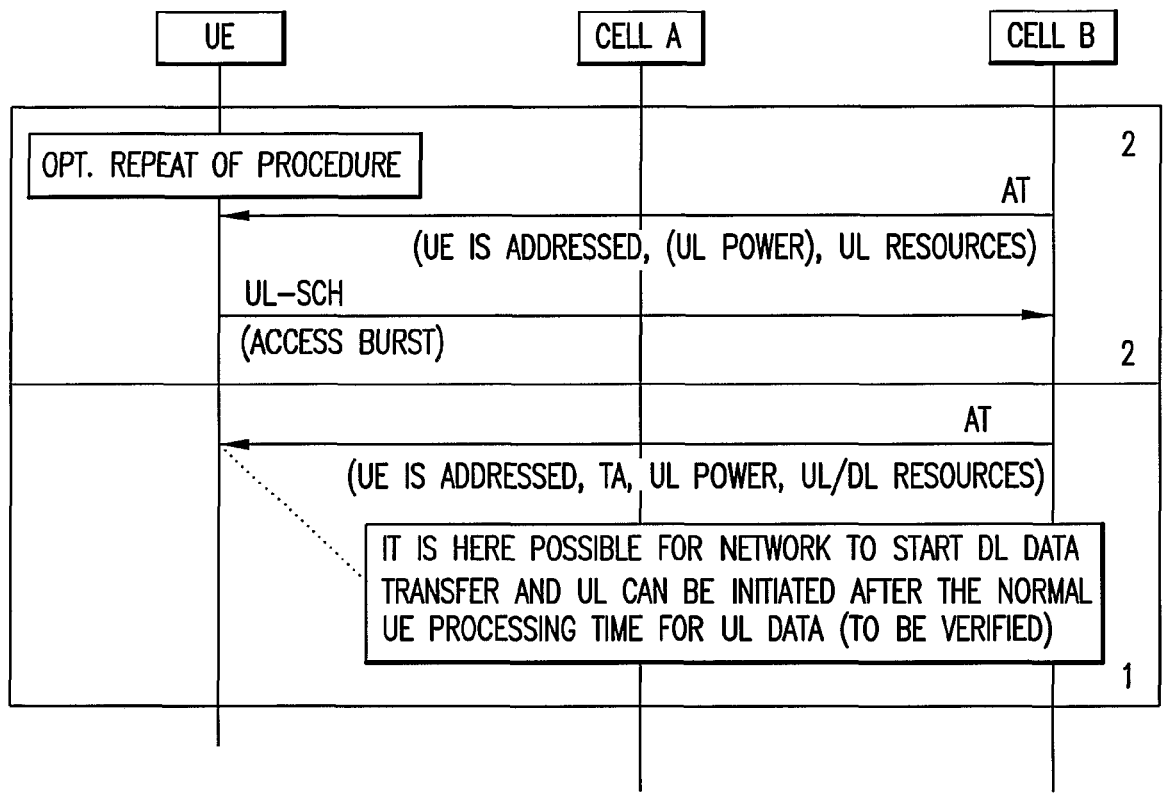
Figure 2E:
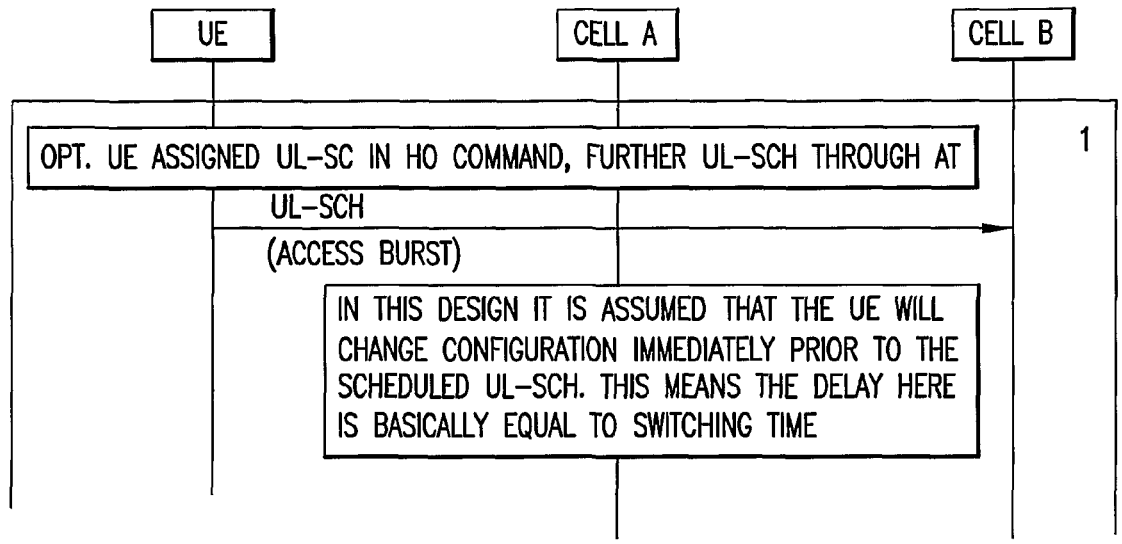
Figure 2F:
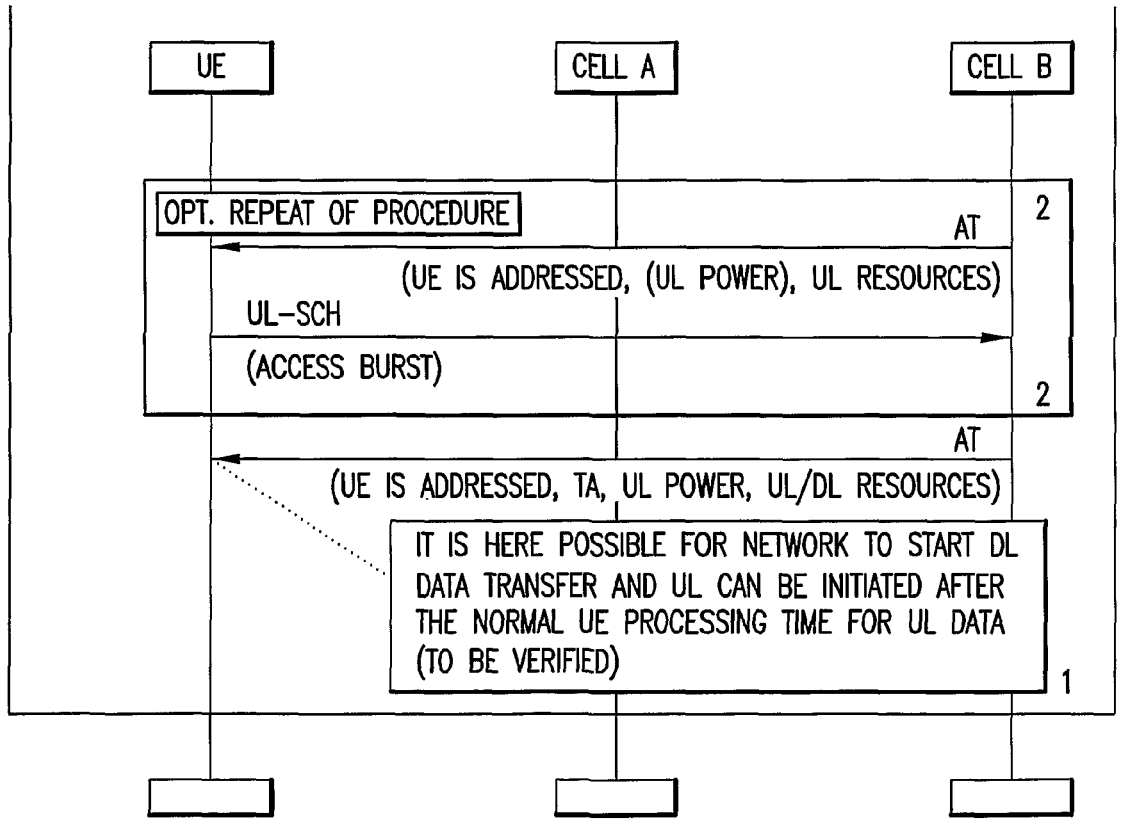

FIGS. 2A, 2B, 2C, 2D, 2E and 2F illustrate exemplary signaling scenarios for the following described exemplary embodiments, where FIG. 2A represents the initial phase of the HO procedure, and FIGS. 2B-2F illustrate various options (OPT). In these Figures Cell A is the source cell, and Cell B is the target cell.

In a first exemplary embodiment, where the HO command does not include UL resource allocations, the UE 10 waits for its C-RNTI to appear in the DL signaling to begin transmitting on the UL-SCH. In this case, upon expiration of a timer (timer 10E) initiated at HO, and if the C-RNTI has not been received, (FIG. 2B) the UE 10 initiates a random access procedure in the RACH channel while remaining in a RRC_CONNECTED state. Note that the value of the timer maybe linked to the services currently active in the UE 10, the more stringent the delay requirements of the service, the shorter the timer. Alternatively, if the C-RNTI of the UE has not appeared in the DL signaling at time-out, the UE 10 may regard the HO as a failure and return to previous cell (former serving cell).

Additionally, (FIGS. 2C, 2D) the UE 10 may apply a DRX period in the new cell when receiving an allocation table (AT) for the appearance of the C-RNTI (allocation to send the access burst). The DRX period may be either assigned by the HO COMMAND or by specific DRX signaling, or it may be set autonomously by the UE 10 (e.g., by a fixed DRX period in a specification).

In a further exemplary embodiment, (FIGS. 2E, 2F) where the HO command does include UL resource allocations, the UE 10 begins transmitting on the reserved portion of the UL-SCH that it was allocated in the HO command (assuming the use of some type of fixed allocation where such a reservation is made possible). In this case, the UE 10 can begin transmitting and as soon as entering the new cell if the reservation makes it possible or, alternatively, the UE 10 transmits only on the uplink slot it was allocated at an activation time. If the activation time is too short, and the UE 10 cannot start transmitting at the given time, it may initiate a random access procedure on the RACH while remaining in the RRC_CONNECTED state. Alternatively, if the UL-SCH is reserved in a more persistent manner, the UE 10 may begin transmitting immediately on the reserved resource upon entering the cell, as opposed to using the RACH. Upon expiration of the timer 10E initiated at HO, the UE 10 begins acquiring the TA via the RACH channel. Alternatively the UE 10 may regard the HO as a failure and return to the old cell (former serving cell).

Based on the foregoing it should be apparent that the exemplary embodiments of this invention provide a method, apparatus and computer program product(s) to provide a synchronized HO of the UE 10 in E-UTRAN, wherein in one embodiment where the HO Command does not include UL resource allocations, the UE waits for its C-RNTI to appear in DL signaling before starting transmitting on the UL-SCH, while in another embodiment where the HO Command does include UL resource allocations, the UE begins transmitting on a reserved portion of the UL-SCH.

An exemplary embodiment of this invention is a method to provide a synchronized HO of a mobile device. The method includes receiving a HO command. A determination is made of whether the HO command includes an indication of UL resource allocations. A C-RNTI is waited for in DL signaling if the HO command does not include the indication of UL resource allocations. If the HO command includes the indication of UL resource allocations, transmitting occurs based on the UL resource allocations.

In a further embodiment of the method above, waited for the C-RNTI in DL signaling includes transmitting on an UL-SCH if the C-RNTI in a DL signaling is received before the expiration of a DL signaling time. If the C-RNTI in the DL signaling is not received before the expiration of the DL signaling time, either a random access procedure is initiated in a RACH while remaining in a RRC connected state, or the mobile device returns to a previous serving cell. Additionally, the DL signaling time may be based upon currently active services.

In another embodiment of any of the methods above, the method also includes applying a discontinuous reception period in the new cell when receiving an allocation table for the appearance of the C-RNTI. The discontinuous reception period may be assigned by the HO command, assigned in a discontinuous reception signaling, or set by a predetermined discontinuous reception period.

In a further embodiment of any of the methods above, the HO command includes a TA for a target cell of a HO.

In another embodiment of any of the methods above, the method also includes initiating a HO timer at the start of a HO. In response to the expiration of the HO timer, a TA may be received via a RACH or the mobile device may return to a previous serving cell.

In a further embodiment of any of the methods above, transmitting includes transmitting when entering a new cell on a reserved portion of an UL-SCH which was indicated in the HO command. Alternatively, transmitting may include initiating a random access procedure on a RACH while remaining in a RRC connected state, if the UL resource allocations are insufficient for transmitting needs.

In another embodiment of any of the methods above, the indication of UL resource allocations includes a dedicated random access preamble.

In a further embodiment of any of the methods above, the HO command includes an expiration time of the UL resources.

In another embodiment of any of the methods above, the method is performed as a result of execution of computer program instructions stored in a computer readable memory medium.

A further exemplary embodiment of this invention is a method to provide a synchronized HO of a mobile device. The method includes receiving a HO command. A determination is made of whether the HO command includes an indication of UL resource allocations. If the HO command includes the indication of UL resource allocations, a new cell is accessed (e.g., using contention-free procedure) on a reserved portion of an UL-SCH which was indicated in the HO command. A random access procedure (e.g., a contention-based procedure) is accessed in a RACH if the HO command does not include the indication of UL resource allocations.

In a further embodiment of the method above, the indication of UL resource allocations includes a dedicated random access preamble.

In another embodiment of any of the methods above, the mobile device returns to a previous serving cell in response to the expiration of a HO timer.

In a further embodiment of any of the methods above, the HO command includes an expiration time of the UL resources.

In another embodiment of any of the methods above, the method is performed as a result of execution of computer program instructions stored in a computer readable memory medium.

Another exemplary embodiment of this invention is an apparatus to perform a synchronized HO. The apparatus includes a receiver configured to receive a HO command, a processing unit, and a transmitter. The processing unit determines whether the HO command includes an indication of UL resource allocations, and waits for a C-RNTI in a DL signaling if the HO command does not include the indication of UL resource allocations. The transmitter transmits based on the UL resource allocations, if the HO command includes the indication of UL resource allocations.

In a further embodiment of the apparatus above, the transmitter transmits on an UL-SCH in response to receiving the C-RNTI in a DL signaling before the expiration of a DL signaling time. If the C-RNTI in the DL signaling is not received before the expiration of the DL signaling time, either a random access procedure is initiated in a RACH while remaining in a RRC connected state, or the apparatus returns to a previous serving cell. Additionally, the DL signaling time may be based upon currently active services.

In a further embodiment of the apparatuses above, waited for the C-RNTI in DL signaling includes transmitting on an UL-SCH if the C-RNTI in a DL signaling is received before the expiration of a DL signaling time. If the C-RNTI in the DL signaling is not received before the expiration of the DL signaling time, either a random access procedure is initiated in a RACH while remaining in a RRC connected state, or the apparatus returns to a previous serving cell. Additionally, the DL signaling time may be based upon currently active services.

In another embodiment of any of the apparatuses above, the processing unit applies a discontinuous reception period in the new cell when receiving an allocation table for the appearance of the C-RNTI. The discontinuous reception period may be assigned by the HO command, assigned in a discontinuous reception signaling, or set by a predetermined discontinuous reception period.

In a further embodiment of any of the apparatuses above, the processing unit initiates a HO timer at the start of a HO. In response to the expiration of the HO timer, the receiver may receive a TA via a RACH or the apparatus may return to a previous serving cell.

In another embodiment of any of the apparatuses above, the transmitter also transmits on a reserved portion of an UL-SCH which was indicated in the HO command when entering a new cell. Alternatively, the transmitter initiates a random access procedure on a RACH while remaining in a RRC connected state, if the UL resource allocations are insufficient for transmitting needs.

A further exemplary embodiment of this invention is apparatus to perform a synchronized HO. The apparatus includes a receiver configured to receive a HO command, a processing unit, and a transmitter. The processing unit determines whether the HO command includes an indication of UL resource allocations. The transmitter transmits accesses a new cell on a reserved portion of an UL-SCH which was indicated in the HO command, if the HO command includes the indication of UL resource allocations. If the HO command does not include the indication of UL resource allocations, the transmitter transmits accesses a random access procedure in a RACH.

In another embodiment of the apparatus above, the indication of UL resource allocations include a dedicated random access preamble.

In a further embodiment of any of the apparatuses above, the processing unit returns the apparatus to a previous serving cell in response to the expiration of a HO timer.

In another embodiment of any of the apparatuses above, the HO command includes an expiration time of the UL resources.

Another exemplary embodiment of this invention is an apparatus to perform a synchronized HO. The apparatus includes a means for receiving a HO command. A determining means determines whether the HO command includes an indication of UL resource allocations. The apparatus includes a means for waiting for a C-RNTI in a DL signaling if the HO command does not include the indication of UL resource allocations. A means for transmitting based on the UL resource allocations if the HO command includes the indication of UL resource allocations is also included.

In a further embodiment of the apparatus above, the receiving means is a receiver, the determining means is a processing unit, the waiting means is a processing unit, and the transmitting means is a transmitter.

A further exemplary embodiment of this invention is apparatus to perform a synchronized HO. The apparatus includes a means for receiving a HO command. A means for determining whether the HO command includes an indication of UL resource allocations is also included. A reserved channel access means accesses a new cell on a reserved portion of an UL-SCH which was indicated in the HO command if the HO command includes the indication of LTL resource allocations. The apparatus also includes a random channel access means for accessing a random access procedure in a RACH in response to a determination that the HO command does not include the indication of UL resource allocations.

In a further embodiment of the apparatus above, the receiving means is a receiver, the determining means is a processing unit, the reserved channel access means is a transmitter and the random channel access means is a transmitter.

Note that the various message flows shown in FIG. 2 may be viewed as method steps and/or as operations that result from operation of computer program code.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, message flow diagrams, or by using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

The invention claimed is:

1. A method comprising:
   receiving, at a user equipment, a handover command for a handover from a first cell to a second cell;
   determining whether the handover command includes an indication of uplink resource allocations for the second cell;
   in response to a determination that the handover command includes the indication of uplink resource allocations for the second cell, performing the following by the user equipment: prior to expiration of a timer initiated in response to handover, transmitting based on the uplink resource allocations for the second cell; and
   in response to a determination that the handover command does not include the indication of uplink resource allocations for the second cell, waiting by the user equipment for a cell radio network temporary identifier corresponding to the user equipment in a downlink signaling, upon reception of the cell radio network temporary identifier corresponding to the user equipment, transmitting on an uplink shared channel toward the second cell, and in response to the user equipment having not received the cell radio network temporary identifier corresponding to the user equipment in the downlink signaling and in response to expiration of the timer, the user equipment performs one of returning to a previous serving cell and receiving a timing advance via a random access channel.

2. The method according to claim 1, wherein the handover command comprises the timing advance for the second cell of the handover and using the timing advance for the transmitting based on the uplink resource allocations.

3. The method according to claim 1, wherein the indication of uplink resource allocations comprises a dedicated random access preamble.

4. The method according to claim 1, the method further comprising initiating a handover timer at the start of the handover and to use the handover timer to determine whether the expiration time has or has not expired.

5. The method according to claim 1, further comprising using the timing advance for the transmitting based on the uplink resource allocations.

6. The method according to claim 1, further comprising transmitting, in response to entering a new cell, on a reserved portion of an uplink shared channel indicated in the handover command.

7. An apparatus comprising at least one processor; and at least one memory including computer program code, the at least one memory and the computer program code configured to, with the at least one processor, cause the apparatus to perform at least the following:
   to receive, at a user equipment, a handover command for a handover from a first cell to a second cell;
   to determine whether the handover command includes an indication of uplink resource allocations for the second cell;
   in response to a determination that the handover command includes the indication of uplink resource allocations for the second cell, performing the following by the user equipment: prior to expiration of a timer initiated in response to handover, to transmit based on the uplink resource allocations for the second cell; and
   to wait by the user equipment for a cell radio network temporary identifier corresponding to the user equipment in a downlink signaling in response to a determination that the handover command does not include the indication of uplink resource allocations for the second cell, upon reception of the cell radio network temporary identifier corresponding to the user equipment, to transmit on an uplink shared channel toward the second cell, and in response to the user equipment having not received the cell radio network temporary identifier corresponding to the user equipment in the downlink signaling and in response to expiration of the timer, the user equipment performs one of returning to a previous serving cell and receiving a timing advance via a random access channel.

8. The apparatus according to claim 7, wherein the at least one memory and the computer program code are further configured to cause the apparatus to initiate a handover timer at the start of the handover and to use the handover timer to determine whether the expiration time has or has not expired.

9. The apparatus according to claim 7, wherein the at least one memory and the computer program code are further configured to cause the apparatus to use the timing advance for the transmitting based on the uplink resource allocations.

10. The apparatus according to claim 7, wherein the at least one memory and the computer program code are further configured to cause the apparatus to transmit, in response to entering a new cell, on a reserved portion of an uplink shared channel indicated in the handover command.

11. The apparatus according to claim 7, wherein the handover command comprises the timing advance for the second cell of the handover, and the at least one memory and the computer program code are further configured to cause the apparatus to use the timing advance for the transmitting based on the uplink resource allocations.

12. The apparatus according to claim 7, wherein the indication of uplink resource allocations comprises a dedicated random access preamble.

13. A method comprising:
    receiving, at a user equipment, a handover command for a handover from one cell to a new cell;
    determining whether the handover command includes an indication of uplink resource allocations for the new cell; and
    in response to a determination that the handover command includes the indication of uplink resource allocations for the new cell, performing the following by the user equipment: prior to expiration of a timer initiated in response to handover, accessing the new cell on a reserved portion of an uplink shared channel indicated in the handover command; and
    in response to a determination that the handover command does not include the indication of uplink resource allocations for the new cell, waiting by the user equipment for a cell radio network temporary identifier corresponding to the user equipment in a downlink signaling, upon reception of the cell radio network temporary identifier corresponding to the user equipment, transmitting on an uplink shared channel toward the new cell, and in response to the user equipment having not received the cell radio network temporary identifier corresponding to the user equipment in the downlink signaling and in response to expiration of the timer, the user equipment performs one of returning to a previous serving cell and receiving a timing advance via a random access channel.

14. The method according to claim 13, wherein the indication of uplink resource allocations comprises a dedicated random access preamble.

15. A non-transitory computer program product comprising a computer-readable medium bearing computer program code embodied therein for use with a computer to perform actions comprising:
    receiving, at a user equipment, a handover command for a handover from one cell to a new cell;
    determining whether the handover command includes an indication of uplink resource allocations for the new cell;
    in response to a determination that the handover command includes the indication of uplink resource allocations for the new cell performing the following by the user equipment: prior to expiration of a timer initiated in response to handover, accessing the new cell on a reserved portion of an uplink shared channel indicated in the handover command; and
    in response to a determination that the handover command does not include the indication of uplink resource allocations for the new cell, waiting by the user equipment for a cell radio network temporary identifier corresponding to the user equipment in a downlink signaling, upon reception of the cell radio network temporary identifier corresponding to the user equipment, transmitting on an uplink shared channel toward the new cell, and in response to the user equipment having not received the cell radio network temporary identifier corresponding to the user equipment in the downlink signaling and in response to expiration of the timer, the user equipment performs one of returning to a previous serving cell and receiving a timing advance via a random access channel.

16. The non-transitory computer program product according to claim 15, wherein the indication of uplink resource allocations comprises a dedicated random access preamble.

17. An apparatus comprising at least one processor; and at least one memory including computer program code, the at least one memory and the computer program code configured to, with the at least one processor, cause the apparatus to perform at least the following:
    to receive at a user equipment a handover command for a handover from one cell to a new cell;
    to determine whether the handover command includes an indication of uplink resource allocations for the new cell;
    in response to a determination that the handover command includes the indication of uplink resource allocations for the new cell, performing the following by the user equipment: prior to expiration of a timer initiated in response to handover, to access the new cell on a reserved portion of an uplink shared channel indicated in the handover command; and
    to wait by the user equipment for a cell radio network temporary identifier corresponding to the user equipment in a downlink signaling in response to a determination that the handover command does not include the indication of uplink resource allocations for the new cell, upon reception of the cell radio network temporary identifier corresponding to the user equipment, to transmit on an uplink shared channel toward the new cell, and in response to that the user equipment having not received the cell radio network temporary identifier corresponding to the user equipment in the downlink signaling and in response to expiration of the timer, the user equipment performs one of returning to a previous serving cell and receiving a timing advance via a random access channel.

18. The apparatus according to claim 17, wherein the indication of uplink resource allocations comprises a dedicated random access preamble.

* * * * *